Feb. 27, 1945.  O. H. BANKER  2,370,131
CHANGE-SPEED TRANSMISSION FOR AIRCRAFT
Filed July 4, 1942  2 Sheets-Sheet 1
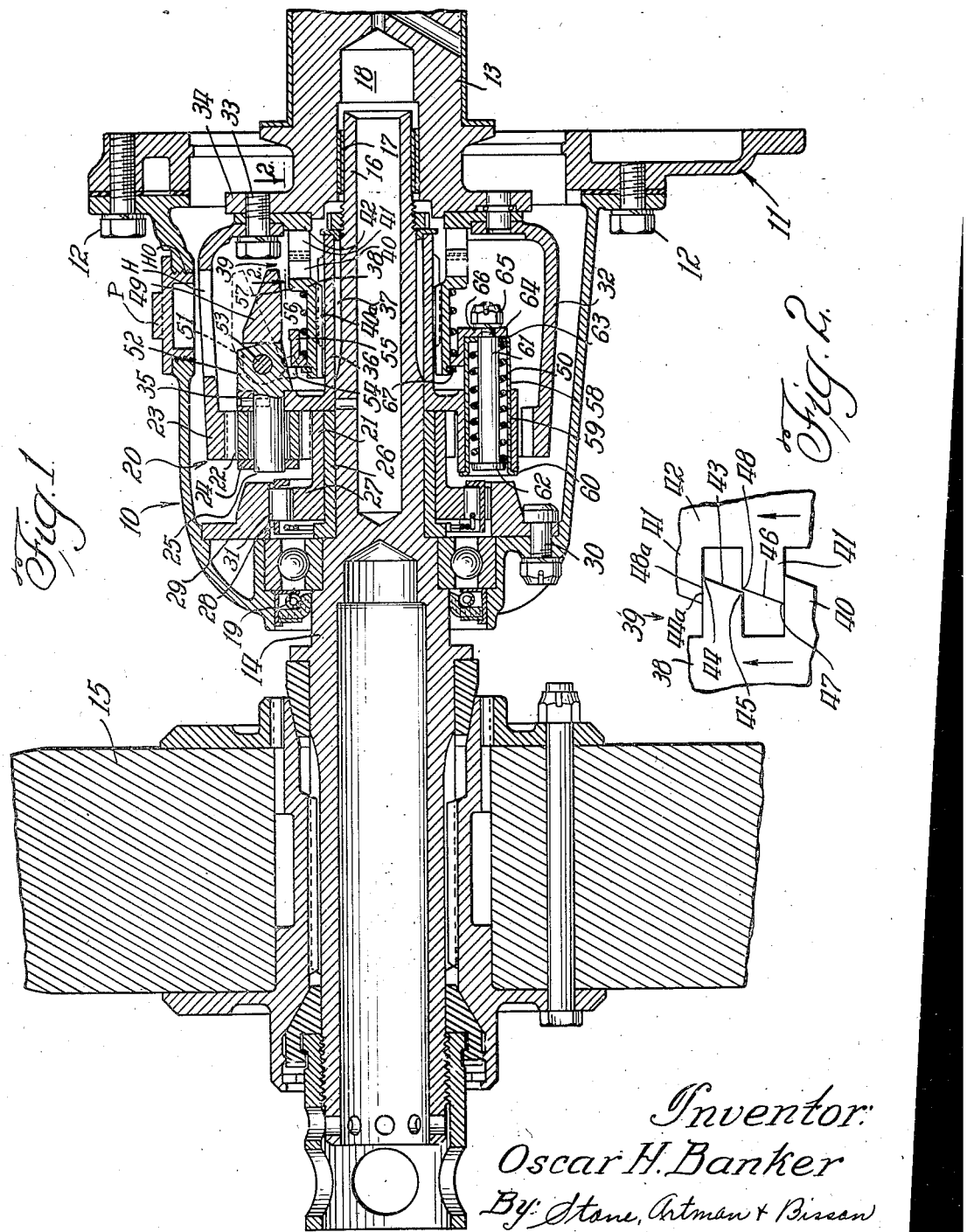
Inventor:
Oscar H. Banker
By Stone, Artman & Bisson
Att'ys.

Feb. 27, 1945. O. H. BANKER 2,370,131
CHANGE-SPEED TRANSMISSION FOR AIRCRAFT
Filed July 4, 1942 2 Sheets-Sheet 2
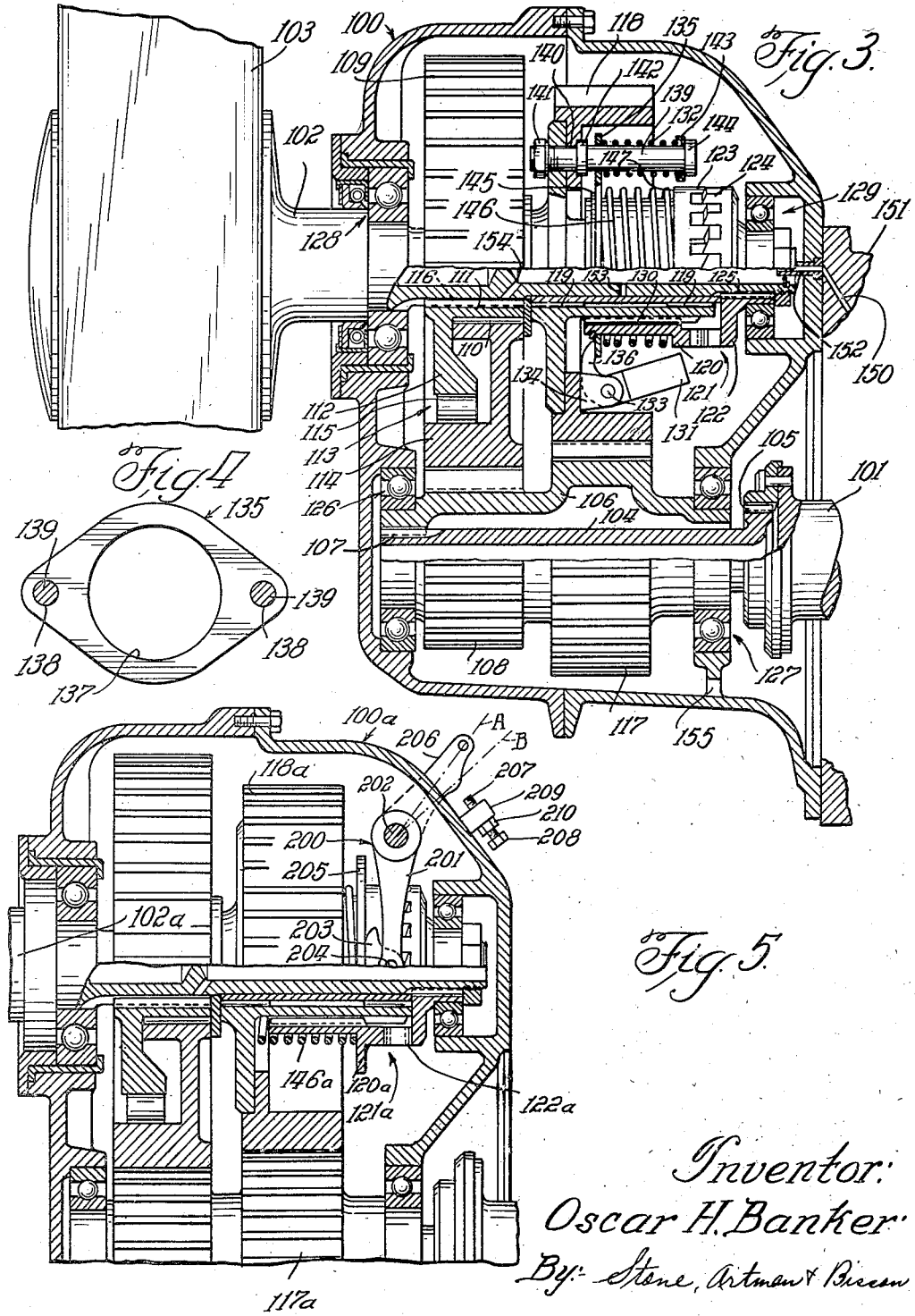
Inventor:
Oscar H. Banker
By Stone, Artman & Bisson
Attys.

Patented Feb. 27, 1945

2,370,131

UNITED STATES PATENT OFFICE 2,370,131

CHANGE-SPEED TRANSMISSION FOR AIRCRAFT

Oscar H. Banker, Evanston, Ill., assignor to New Products Corporation, Chicago, Ill., a corporation of Delaware Application July 4, 1942, Serial No. 449,717

10 Claims. (Cl. 74—260)

This invention has to do with a change-speed transmission particularly suitable for use between the engine and the propeller of aircraft and relates more particularly to and has as a general object, the provision of an improved combination and character of power trains in such transmission, expediting shifting of the power trains and enabling a higher speed transmission of said trains to serve as a transmitter of cranking force from the propeller to the engine while conditioned to permit driving of the propeller from the engine through a power train of lower speed transmission.

A more specific object of the invention is the provision, in an aircraft change-speed transmission, of a lower speed power train operable to allow the propeller to overrun the engine so said train can remain mobilized during drive of the propeller through a higher speed train which contains a jaw clutch of which toothed counterparts are meshable, when synchronized, to establish such higher speed train in driving relation between the engine and propeller, and of which counterparts the teeth are bevelled to facilitate a condition of partial meshing and consequent ratcheting of one counterpart over the other in one direction to render the higher speed train incapable of transmitting driving force from the engine to the propeller so the engine is operable to drive the propeller through the lower speed train, and such bevelling further causing the teeth in said partial meshed relation catch to prevent ratcheting when the propeller tends to overrun the engine whereby said higher speed train is effective as a transmitter of cranking force from the propeller to the engine.

The invention further contemplates speed responsive means in control of said clutch and becoming enabled, when subjected to speeds above a predetermined minimum, to cause adjustment of the clutch from the partial meshed relation to a substantial meshed relation wherein the counterparts are rotatable in unison in both directions, upon synchronization of the counterparts.

These and other desirable objects inherent in and encompassed by the invention will be better understood from the ensuing description together with the annexed drawings, wherein:

Fig. 1 is a sectional view taken longitudinally through a planetary gear type of change-speed transmission construction according to the principles of the present invention;

Fig. 2 is an enlarged fragmentary view taken on a line 2—2 of Fig. 1 and illustrates the teeth of a jaw clutch in a partially meshed condition, wherein the teeth are adapted to ratchet in one direction to permit relative rotation of the counterparts but to catch upon one another for preventing relative rotation in the opposite direction;

Fig. 3 is a view taken similarly to Fig. 1 through a modified form of the invention employing parallel shafts;

Fig. 4 is a plan view of a spring abutment plate employed in the speed responsive clutch actuating means shown in Fig. 3; and Fig. 5 is a view taken like Figs. 1 and 3 through a third form of transmission embodying the principles of this invention.

Referring now to Fig. 1, the transmission apparatus there shown is enclosed within a gear box 10 open at its back end, which is disposed at the right as viewed in Fig. 1, and which is secured to the front end of an aircraft engine 11 by machine bolts 12. The drive shaft 13 of the transmission may constitute a portion of the engine crank shaft, and is arranged coaxially with a driven shaft 14 which serves as a propeller shaft for the propeller 15 of an aircraft (not shown) upon which the apparatus is installed. A back end portion 16 of reduced diameter of the driven shaft is piloted upon a bushing unit 17 within a recessed portion 18 of the drive shaft 13. An intermediate portion of the driven shaft is journaled within a ball bearing unit 19 which is carried in the front wall of the gear box 10.

A planetary gear unit 20 includes a sun gear 21, a plurality of planet gears 22 of which one is shown and a ring gear 23. A carrier 24 of the planetary gear unit 20 has secured therein a plurality of axially directed and circumferentially spaced shafts 25 upon which the planet gears 22 are respectively journaled.

The sun gear 21 is rotatively mounted upon a bearing sleeve 26 which in turn is supported upon the driven shaft 14. Said sun gear is formed integrally with an actuator 27 of a conventional structure forming an element of an overrunning holding device or brake 28. The other elements of the overrunning brake 28 include a ring 29 secured non-rotatively to the gear box by a plurality of circumferentially spaced bolts 30 in coaxial relation with the actuator member 27, and circumferentially spaced rollers 31 disposed between the actuator member 27 and ring 29. The actuator member 27 is so constructed in a manner well understood in the art, that it is operable to cause the rollers 31 to react upon the inner periphery of the ring 29 for preventing clockwise rotation of said actuator member 27 and hence of the sun gear 21 relatively to the ring 29, with respect to an observation point located forwardly of the transmission, that is, to the left of the left end of the transmission as viewed in Fig. 1. Said actuator 27 will however permit the sun gear 21 to rotate counter-clockwise.

Hereinafter unless specified to the contrary all directions of rotations will be given with respect to a reference point located forwardly of the transmission.

The ring gear 23 is formed integrally with and is upon the front end of a drum 32 of which the back end is secured by bolts 33 to a flange 34 upon the drive shaft 13.

A back plate 35 constituting a part of the carrier 24 has a hub-like sleeve portion 36 projecting rearwardly in splined relation with the driven shaft 14 as indicated at 37. One counterpart 38 of a jaw clutch 39 is splined at 40a to the outer periphery of the member 36. This counterpart 38 has a group of circumferentially spaced axially directed teeth 40 which are meshable with a likewise arranged group of teeth 41 upon a counterpart 42 of said clutch 39 that is secured to the driving shaft flange 34 and to the ring gear 23 by the bolts 33. In Fig. 2 the end faces 43 of the teeth 40 are seen to be beveled spirally of the clutch in such a direction that the leading edges 44 of said faces extend a greater distance rearwardly than the trailing edges 45. A corresponding bevel is placed upon the end faces 46 of the teeth 41 whereby the trailing edges 47 of these faces extend forwardly a greater distance than the leading edges 48 thereof. Manipulation of the clutch 39 for adjusting it from a partially meshed condition illustrated in Fig. 2 to a substantially meshed position is accomplished by sliding the counterpart 38 axially rearwardly upon the splined connection 40.

Speed responsive means for controlling the axial positioning of the clutch counterpart 38 includes centrifugal weight members 49 and helical springs 50 of which one of each is shown in Fig. 1. These weights 49 and the springs 50 are distributed alternately circumferentially about the carrier axis. Each weight 49 has apertured bifurcations 51 that straddle an apertured head 52 therebetween that are integral with certain of the planet gear shafts 25. Pivot pins 53 for the weights 49 are disposed within the apertures of said heads and in the bifurcations of the respectively associated weights. Each weight 49 has a boss 54 that extends radially inwardly of the transmission into abutting relation with the front end of a ring 55 slidable axially upon the clutch counterpart 38. A light helical spring 56 is disposed about said clutch counterpart between said ring 55 and a shoulder portion 57 of said counterpart. Counterclockwise rotation of the weights 49, as the weight shown in Fig. 1 is viewed in that figure, will cause rearward displacement of the bosses 54 and compression of the spring 56 whereby the latter will urge the counterpart 38 into mesh with the counterpart 42 with a relatively small yieldable force.

The aforesaid springs 50 are for opposing the centrifugally developed force of the weights 49 in urging the ring 55 rearwardly. The springs 50 are contained in cylindrical spring chambers 58 which are disposed within holes 59 of the planet carrier, and the front open ends of the spring chambers are flanged outwardly at 60 for preventing rearward displacement thereof. A bolt 61 is disposed coaxially within each of the spring chambers 58 and coaxially within the respectively associated spring 50 and has upon its forward end a head 62 for reacting against the forward end of said associated spring. The back end of each bolt 61 projects rearwardly through a hole 63 in its associated spring chamber whereby the bolts may be projected rearwardly through said hole 63 incident to compressing their associated springs 50 while the back ends of those springs react against the back closed ends of their respective spring casings 58. Apertured ears 64 upon the ring 55 are connected with threaded sections of reduced diameter upon the back ends of the bolts 61 by nuts 65 which press said ears firmly against shoulders 66 of the bolts. Thus the ring 55 is connected rigidly to the reciprocal bolts 61 and is normally held at the forward limit, determined by abutment of the ears 64 with the back end of the spring chambers 58. A snap ring 67 near the forward end of the jaw clutch counterpart 38 abuts against the ring 55 to limit the axial rearward displacement of the counterpart 38 with respect to the ring 55 under the force exerted by the light clutch-engaging spring 56.

*Operation of the first embodiment*

Normally the springs 50, in reacting against the back ends of the spring chambers 58 apply a forward force against the heads 62 of the bolts 61 and thereby retain the ring 55 at its forward reciprocal limit against the back ends of the spring chambers. When the ring 55 is in this forward most position it acts against the snap ring 67, in opposition to the yieldable force of the clutch-engaging spring 56 for limiting backward displacement of the clutch counterpart 38 to a partially meshed relation with the counterpart 42 as that illustrated in Fig. 2. In this latter mentioned figure it will be seen that the clutch counterpart 42 may rotate counter-clockwise, the direction indicated by the arrow thereon in Fig. 2, relative to the counterpart 38 incident to causing the teeth 41 to ratchet over the teeth 40 while sliding the end faces 46 of the teeth 41 along the end faces 43 of the teeth 40. There is sufficient clearance between the forward end of the clutch counterpart 38 and the planet carrier plate 35 to permit forward displacement of said counterpart against the yielding urge of the spring 56 and as caused by the camming action between the tooth end faces 43 and 46 during the aforesaid ratcheting of the counterpart teeth.

Therefore, the parts of the transmission will normally be in the position illustrated in Figs. 1 and 2.

The transmission is designed for use in connection with an engine which drives the crank shaft 13 counter-clockwise, and in starting an aircraft from rest equipped with such an engine, the transmission will first transmit power to the propeller 15 through a speed reduction power train, whereby sufficient engine speed is attainable for the development of high power by the engine and torque multiplication is obtained through the transmission to the propeller. This speed reduction power train includes the drum 32 which is driven from the drive shaft 13, the ring gear 23, planet gears 22 which are caused to rotate counter-clockwise about their individual axes while reacting against the sun gear 21 and moving orbitally thereabout incident to rotating the planet carrier 24 counter-clockwise at reduced speed, said planet carrier, the sleeve hub 36 of said carrier, the splined connection 37 between the sleeve hub 36 and the driven shaft 14, said driven shaft and the propeller 15. Because of the resistance to rotation of the propeller and hence of the planet carrier 24 connected therewith the axle shafts 25 of the planet gears 22 resist orbital movement and thus cause the planet gears 22, when rotated counter-clockwise about their individual axes by the force imparted thereto by the counter-clockwise rotating ring gear 23, to tend to drive the sun gear 21 clockwise. But as explained hereinabove clockwise rotation of the sun gear 21 is prevented by the one-way brake device 28.

During operation of the first speed power train just traced, the clutch counterpart 38 which is connected for rotation with the planet carrier 24 will be rotating counter-clockwise as indicated by the arrows in Fig. 2, more slowly than the clutch counterpart 42 which is connected for rotation in unison with the drive shaft 13. Consequently during operation of the first speed power train the clutch counterpart 42 ratchets over the clutch counterpart 38.

Upon the attainment of a predetermined minimum speed the planet carrier 24 will rotate sufficiently fast for causing the weights 49 to throw radially outwardly from the full line position shown in Fig. 1 to positions corresponding to the dotted line position shown for the weight 49 in Fig. 1. This pivotal movement of the centrifugal weights occurs about the axis in their respective pivot pins 53 and causes forward displacement of the bosses 54 and hence of the ring 55 against the urge of the springs 50, the augmentation in the force of the spring 56 as it is compressed by such forward movement of the ring 55 being substantially negligible in opposing radial outward displacement of said centrifugal weights. The spring 56 is made very light so that the force created therein for pressing the counterparts into ratcheting relation will not be so great as to impair the clutch teeth or cause undue ratcheting noise even after the increase in the pressure exerted by said spring by the backward displacement of the ring 55 incident to radial outward displacement of the centrifugal weights.

So long as power is transmitted through the lower speed power train in the manner described the ratcheting of the jaw clutch counterparts will continue and said power train will remain established in driving relation between the engine and the propeller. However, after the centrifugal weights 49 have been thrown outwardly for advancing the ring 55 the speed responsive control is so conditioned that a change-over can be made into a higher speed power train, which in this instance is a power train of one to one driving ratio. This higher speed power train is established by causing the jaw clutch counterparts to mesh and is brought about by closing or partially closing the engine throttle so the drive shaft 13 and the clutch counterpart 42 connected therewith will slow down to synchronism with the counterpart 38. Thus the shift from the lower speed train to the higher speed train is effected at the will of the operator.

In the execution of a shift from the lower speed power train to the power train of higher speed and upon the slowing down of the drive shaft 13 comparatively rapidly because of the braking action of engine compression, the propeller 15, because of its inertia and also because of the air stream acting thereon as a result of the forward movement of the craft, will decelerate relatively slowly. It follows that during this synchronization period of the clutch counterparts 42 and 38 the planet carrier 24 and the ring gear 23 which are rigidly connected respectively with the counterparts 38 and 42 will approach the same speed and will eventually attain the same speed concurrently with synchronization of the counterparts 38 and 42, and when this occurs the clutch counterparts mesh to transmit driving force directly between the drive and driven shafts independently of and without applying force upon the teeth of the gears in the planetary gear unit.

At the beginning of the synchronization period the sun gear 21 was reacted upon by the planet gears 22, then rotating about their individual axes, in such a manner that it had a tendency to rotate clockwise, which tendency was overcome by the one-way holding device 28; and since at the end of the synchronization period the sun gear attains the clockwise rotational speed of the ring gear 23, said sun gear, during the synchronization period, is accelerated counter-clockwise from zero speed to the speed of the ring gear. The one-way holding device 28 permits this counter-clockwise rotation of the sun gear 21 and in doing so lends to the lower speed power train the character of an overrunning power train whereby the drive shaft 13 may decelerate with respect to the driven shaft 14. When the drive shaft decelerates to the same speed as the driven shaft, the spring 56 will slide the counterpart 38 rearwardly into meshed relation with the counterpart 42, establishing the higher speed train. Power is then transmitted from the drive shaft 13 to the drive counterpart 42, thence to the driven counterpart 38, the sleeve-like hub 36 of the planet gear carrier, and the splined connection 37 to the driven shaft 14. Meanwhile, and during operation of the higher speed power train, the sun gear 21 and the one-way holding device actuator member 27 overrun the ring 29 of said holding device as permitted by the rollers 31.

The shift into the higher speed power train from the lower speed train will be executed after the aircraft has finished take-off and climbed to the desired altitude where the aircraft is drivable at ordinary cruising speeds with the application of less torque to the propeller. Establishment of the higher speed power train between the engine and the propeller under ordinary cruising conditions enables the motor, while rotating at a reasonably low speed, to drive the propeller at the desired speed.

A shift down into the lower speed power train for use in driving the propeller at higher speed may be necessary in maneuvering the craft or in obtaining rapid climb. It is incurred by throttling down the engine and hence the propeller and planetary carrier directly connected therewith, to a speed at which the springs 50 are effective for drawing the centrifugal weights 49 inwardly whereby said springs, upon expanding, will draw the ring 55 forwardly together with the snap ring 67 and the forward clutch counterpart 38 for demeshing the clutch 39 and thus demobilizing the higher speed train. Drive is then available through the lower speed train simply by speeding up the engine and the drive shaft 13 whereupon the one-way holding device 28 again becomes effective for preventing clockwise rotational tendencies of the sun gear 21.

It should be noted that the two speed change-speed transmission just described is always conditioned so that one or the other of the power trains is mobilized for the transmission of power from the engine to the propeller. There is no neutral. It follows that the craft will never be stranded in flight with the engine disconnected from the propeller.

Another important operating feature of the transmission is its ever present potential employment as a cranking force transmitter between the propeller and the engine.

It was explained hereinabove that the ring 55 is limited in its forward displacement by the ears 64 abutting against the back ends of the spring chambers 58 so that when the apparatus is at rest the spring 56 can be effective for urging the counterpart 38 rearwardly into the partial meshing relation with the driven counterpart 42 illustrated in Fig. 2, but is unable to force the counterpart 38 any farther rearwardly or into mesh with said counterpart 42. During this partial meshed relation of the clutch counterparts 38 and 42 the drive counterpart 42 is free to overrun the counterpart 38 as it does during operation of the lower speed train. Such overrun of the drive counterpart is possible because the leading edges of the faces 46 on the teeth 41 are axially spaced from the trailing edges 45 of the faces 43 on the teeth 40 so that when the counterpart 42 is rotated counter-clockwise with respect to the counterpart 38 a leading portion of the faces 46 will first abut against trailing portions of the faces 43 so that a sliding camming or ratcheting relation is established between the clutch counterparts. However should the propeller 15 and the driven shaft 14 tend to overrun the drive shaft 13 and the counterpart 42 connected therewith, the leading faces 44a of the clutch teeth 40 will abut flatly against the trailing face portions 48a of the teeth 41, and this catching of the teeth 40 upon the teeth 41 will cause the drive shaft 13 and the engine connected therewith to be rotated with the propeller. Hence a forward rotational cranking force is impartable from the propeller to the engine through the higher speed power train even though that power train is disestablished for the transmission of driving force from the engine to the propeller. Less torque may be applied to the propeller for cranking the engine through the higher speed train than through the lower speed train inasmuch as the lower speed train, if power were transmitted through it from the propeller to the engine would tend to cause the engine to rotate at an overspeed with respect to the propeller.

It will be further noted that the partially meshed clutch 39 mobilizes the high speed power train when the centrifugal weights 49 are in their radial inward position as when the craft is at rest upon the landing field. Therefore, the propeller may be employed for manually cranking the engine for initially starting it although the lower speed power train that is overrunning in character is initially available for driving the propeller from the engine under take-off conditions.

Since the transmission is operable for transmitting cranking force from the engine through the higher speed power train, assurance is had that a dead motor upon a craft in flight may be started by reactive force of the air upon the propeller blades. Upon the motor becoming stalled, should the transmission have been connected in the higher speed power train at the time of its failing, the compression of the engine will cause the transmission to act through said higher speed train in slowing down the propeller and the planet gear carrier whereupon the inertia weights will be forced inwardly by the springs 50 and the ring 55 pulled forwardly for adjusting the clutch 39 from the substantial meshed condition to the partially meshed condition shown in Fig. 2. This adjustment of the clutch 39 will not impair the mobilization of the higher speed power train for serving as a cranking force transmitter between the propeller and engine so that by diving with the craft for causing the air to react with sufficient force against the propeller blades for causing it to rotate forwardly, that is counter-clockwise, the clutch 39 will impart said clockwise rotation to the engine for cranking the same.

In view of the importance of the partial engagement of the clutch counterparts 38 and 42, provision is made for their periodic inspection through holes H and HO respectively in the bell 32 and the gear box. A threaded plug P normally closes the hole HO.

The modification shown in Fig. 3 has operating characteristics similar to that shown in Figs. 1 and 2 but employs parallel shafting instead of planetary gearing. Another difference between the modification of Fig. 3 and that of Figs. 1 and 2 is that all power trains are speed reduction trains, there being two power trains one constituting a starting speed power train and the other a cruising speed power train.

The transmission, housed in a gear box 100, transmits power from a drive shaft 101 which may be the end of an engine crank shaft, to a driven shaft 102 which is drivingly connected with a propeller 103. The lower speed power train or starting speed power train includes a relatively small diameter hollow shaft 104 splined at 105 to the drive shaft 101 and to a hollow gear cluster shaft 106 at 107, a gear 108 of relatively small diameter on said cluster, a gear 109 journalled at 110 on a hub 111 of an overrunning clutch actuator member 112, an overrunning clutch device 113 (including a cylindrical portion 114 of the gear 109, said actuator member 112 and overrunning clutch rollers 115 disposed between said actuator member and the cylindrical portion 114), the hub 111 of the actuator member 112 that is splined at 116 to the driven shaft 102, and said driven shaft to the propeller 103. The overrunning clutch 113 is designed to prevent the gear 109 overrunning the actuating member 112 in the clockwise direction as viewed from the front or left of the transmission as shown in Fig. 3, but permits the actuator member 112 to overrun the gear 109 in said clockwise direction. The construction of such an overrunning clutch device is well understood in the art.

The higher speed power train includes the aforesaid hollow gear cluster 106, a gear 117 integral with said gear cluster, a gear 118 meshed with the gear 117 and journalled upon bearings 119 for rotation coaxially of and about the driven shaft 102, a jaw clutch counterpart 120 of a jaw clutch 121, a counterpart 122 of said jaw clutch (when the teeth 123 and 124 respectively upon said counterparts 120 and 122 are meshed in a manner presently to be described), a splined connection 125 of the counterpart 122 with the driven shaft 102, and through said driven shaft to the propeller 103. During operation of the higher speed train the actuating member 112 of the overrunning clutch device 113 will be rotated clockwise at an overspeed with respect to the gear 109 as permitted by the clutch rollers 115.

The gear cluster 106 is a full floating unit, it being journalled at its two ends by means of ball bearing units 126 and 127 which are supported respectively in the front and back end walls of the gear box. The ball bearing units 128 and 129 also respectively in the front and back walls of the gear box rotatively carry the hollow driven shaft 102.

The driving counterpart 120 of the overrunning jaw clutch 121 is splined to the hub of the gear 118 at 130 and is axially slidable upon said gear hub between reciprocal limits in which the clutch teeth 123 and 124 are respectively in a partially meshed condition and a substantially meshed condition as explained hereinabove with respect to the clutch teeth in the first embodiment. In Fig. 3 the clutch teeth 123 and 124 are illustrated in the partially meshed condition.

Speed responsive means for controlling the axial position of the drive counterpart 120 is carried by the gear 118. Said speed responsive means or mechanism includes centrifugal weights 131 spaced apart diametrically with respect to said gear, although draftsman's license has been taken in Fig. 3 to show but one of the weights 131 and a helical spring 132 of which there are two spaced diametrically across the gear 118 from one another and spaced 90° circumferentially of the gear with respect to the weights 131. Said weights 131 are pivotally carried by pins 133 anchored within respective bosses 134 which may be formed integrally with the gear 118. A generally elliptical plate 135, shown in plan in Fig. 4, is engaged by tail portions 136 of the weights 131. This plate 135 has a large central opening 137 which receives a forward portion of the drive counterpart 120, adapting the plate to be slid axially of said counterpart. Holes 138 near opposite ends of the elliptical plate 135 respectively receive spring guide posts 139 projecting axially of the gear 118 and having their front ends inserted through apertures 140 therein and held in place by means of nuts 141 threaded onto the forward ends of said posts for coacting with shoulders 142 in holding said posts firmly in place upon the gear. The aforesaid springs 132 are carried upon the spring guide posts 139 where the front ends of said springs react rearwardly against respective spring seats 143 which in turn abut against the heads 144 of the respective posts 139, while the forward ends of springs react against the portion of the plate 135 immediately about the plate holes 138. This expansive force exerted by the springs 132 tends to hold the plate 135 in its forward most position illustrated in Fig. 3, and which position is determined by abutment of the tails 136 of the weights 131 with the front side of the gear 118. The plate 135 presses against a snap ring 145 upon the drive jaw clutch counterpart 120 to prevent backward axial displacement of this clutch counterpart more distantly than necessary to establish the partial meshed relation of the teeth 123 and 124. A light coiled spring 146 is disposed about the drive counterpart 120 and reacts against the back face of the plate 135 and against a shoulder 147 on said counterpart for urging said counterpart rearwardly into the partially meshed relation with the driven counterpart. However, there is sufficient clearance between the front end of said counterpart 120 and the front face of the gear 118 to permit forward displacement of said counterpart pursuant to ratcheting of the clutch teeth 123 and 124.

When the gear 118 is at rest or is being driven at a slow speed through the low speed power train above described the springs 132 will be effective for holding the plate 135 and the tails 136 of the centrifugal weights 131 forwardly and the weights themselves in their radially inwardly disposed position. The parts will occupy their respective positions illustrated in Fig. 3. It will be noted that the gear 118 is driven at a speed constituting a function of the drive shaft speed during operation of the lower speed train, so that when the drive and driven shafts reach respective predetermined speeds the gear 118 will reach a corresponding predetermined minimum speed at which the weights 131 will fly radially outwardly in opposition to the force of the springs 132 and thereby displace the elliptical plate 135 rearwardly, enabling the spring 146 to press the clutch counterpart 120 a greater distance axially rearwardly before abutment is had by the snap ring 145 at said plate 135. When the weights 131 are in their radially outward position the spring 146 can advance the counterpart 120 rearwardly sufficiently far for effecting said substantial meshing of the clutch teeth 123 and 124, although so long as the lower speed train is established and in operation ratcheting of the teeth 123 and 124 will continue.

While driving the propeller from the engine through the lower speed power train at a speed sufficiently high for the weights 131 to be in their outer radial position, the operator can initiate a shift for establishing the second or higher speed power train between the engine and propeller simply by closing the engine throttle for causing the engine, the shaft 101, shaft 104, gear cluster 106, gears 109 and 118 and the clutch counterpart 120 to slow down whereas the inertia and air stream action upon the propeller 103 result in it decelerating more slowly and in a corresponding slower deceleration of the driven shaft 102, the overrunning clutch actuator 112 splined to said driven shaft and the clutch counterpart 122 splined to said driven shaft. This relatively slower deceleration of the propeller and said parts connected for rotation therewith with respect to the engine and the aforesaid parts drivingly connected therewith is made possible by the overrunning clutch 113. Eventually the clutch counterpart 120 will decelerate to synchronism with the counterpart 122 whereupon the spring 146 will slide the counterpart 120 rearwardly for substantial mesh of the teeth 123 and 124, thereby establishing the higher speed power train in a two-way driving connection between the engine and the propeller. During operation of the higher speed power train the clutch actuator member 112 will continue to overrun the gear 109.

Should the operator desire to shift downwardly from the higher speed train to the lower speed train while the craft is in flight he can do so by throttling down the engine to a speed at which the gear 118 falls below a predetermined minimum at which the centrifugal force developed by the weights 131 becomes subordinate to the force exerted by the springs 132, enabling these springs to press the plate 135 forwardly together with the snap ring 145 and the clutch counterpart 120 whereby the latter is demeshed from the counterpart 122, and whereupon drive may be resumed through the lower speed train by accelerating the engine for bringing the gear 109 up to the speed of the actuator member 112.

When the parts of the transmission are at rest the higher speed power train is effective as a cranking force transmitter from the propeller to the engine, since at this time the clutch teeth 123 and 124 will be in the partially meshed condition illustrated in Fig. 3. Clockwise rotation of the propeller, which will usually be manually upon a small craft, will cause clockwise rotation of the driven shaft 102 and of the driven clutch counterpart 122, and since the teeth 124 catch upon the teeth 123 when there is a tendency to rotate the counterpart 122 clockwise relatively to the counterpart 120, the counterpart 120 will likewise be caused to rotate clockwise. Thus the gear 118 is caused to rotate clockwise and the gear 117 and the shafts 104 and 101 rotatively connected therewith are caused to rotate counter-clockwise, which is the direction for cranking the engine assumed to be connected with the transmission.

Cranking force is also transmittable through the higher speed power train from the propeller to the engine should the engine stall while the craft is in flight. If at the time of engine stall the craft should be operated in the higher speed power train, the compression of the engine will quickly decelerate the rotatable parts of the transmission until the gear 118 decelerates to a speed at which the centrifugal weights are forced inwardly by the springs 132 incident to causing adjustment of the clutch 121 to the partial meshed condition. Thereafter by diving the craft sufficient torque can be applied to the propeller by the air stream for rotating it in the clockwise direction that has hereinabove been described for driving the engine through the higher speed power train in the direction for cranking such engine.

Forced lubrication is supplied to this form of the transmission from the engine oil pump (not shown) through a channel 150 in the engine block 151, a conduit 152 communicating through the rear gear box wall with said channel 150, the hollow central portion of the driven shaft 102 and laterals such as 153 and 154 which lead radially outwardly of said driven shaft to desired strategic points for the application of the lubricant. Return of the oil pumped into the gear box to the engine may be by gravity through a back wall opening 155 of said gear box beneath the ball bearing unit 127.

A third form of the invention, shown in Fig. 5, is generally like that shown in Fig. 3, so to expedite this description the parts in Fig. 5 identical with or corresponding to those in Fig. 3 will be designated by the same respective reference numerals with the letter "a" added, in lieu of a detailed description of such identical or corresponding parts.

No speed responsive control is provided for the clutch counterpart 120a. Instead there is a manually controlled shifter fork 200 having legs 201 (of which one is shown in Fig. 5) depending along opposite sides of the clutch 121a and fixed upon a cross shaft 202 journalled in the gear box 100a. Each of the legs 201 is provided with a shoe member 203 pivotally connected therewith by a pin 204 and which is adapted to press against a circular flange 205 of the counterpart 120a for shifting said counterpart forwardly against the urge of the spring 146a which bears reactively against the web of the gear 118a. The spring 146a constantly urges the counterpart 120a into mesh with the counterpart 122a, and depending upon the pivotal position of the shifter fork 200, the spring 146 will be effective for holding the counterparts 120a and 122a in partial mesh as described above with the first embodiments or in substantial mesh. Pivoting of the shifter fork 200 is executed manually by a linkage (not shown) connected with the apertured outer end of an arm 206 which is non-rotatively attached to a section of the journalled cross shaft 202. The arm 206 is shown in pivoted position A but is pivotal clockwise, as viewed in Fig. 5, to a position B where it abuts against an end 207 of an adjustable stop member 208 threaded into an aperture in a boss 209 integral with the gear box 100a. A lock nut 210 is employed for maintaining the adjustment of the stop member 208. When the arm 206 is at position A where it is urged by the spring 146a the counterpart 120a will be sufficiently far rearward to effect the condition of substantial mesh of the counterparts 120a and 122a. However, by rotation of the control lever 206 to the position B the shifter fork 200 will cause its shoes 203 to move the counterpart 120a sufficiently forwardly to establish the partial meshed condition of the clutch counterparts.

This third form of the transmission is for use primarily with high speed aircraft such as that of the military type pursuit or fighter plane which also generally have propellers of variable pitch. Normally, in the operation of the transmission, since the engine has an abundance of horsepower, take-off will be through the high speed power train which includes the gears 117a, 118a, the clutch 121a and the driven shaft 102a to which the propeller is attached.

In order that the propeller of the craft shall operate most efficiently it is necessary that the tips of the propeller blades do not exceed a certain maximum speed. During take-off, when the craft and hence the propeller has no forward velocity, the propeller can rotate at a higher rate of speed without causing the tips of the blades to exceed said maximum speed than when the craft has a forward velocity that adds a forward component of speed to the circumferential component due directly to the rotation of the propeller. Moreover, during take-off, it is essential that the variable pitch propeller be adjusted to a low pitch so it will bite with greater efficiency into the air, and under these conditions the propeller will be rotated at relatively high speed, at which the blade tips have a circumferential speed near said maximum so the craft will be accelerated rapidly. Rotation of the propeller at this high speed, when the pitch is small and the torque relatively low, is more efficiently accomplished by the engine when connected with the propeller through a power train that enables the engine to rotate substantially more slowly than the propeller. Consequently it is contemplated that the higher speed power train of the embodiment in Fig. 5 will be connected between the engine and the variable pitch propeller during take-off.

As the craft gains altitude and speed, there is added to the circumferential speed component of the propeller tips a forward component of speed of substantial magnitude which, with said circumferential component, derives a resultant that exceeds said maximum or efficient tip speed. Therefore, when the forward speed of the craft reaches a speed at which the propeller loses its efficiency due to said resultant exceeding said maximum, the pilot can increase the propeller pitch, causing it to bite more deeply into the air and thus enabling it to run at a slower but more efficient speed. Greater torque must be applied to the propeller under these conditions, however, and so it is at this time that the pilot will shift to the lower speed power train to enable the motor to develop the necessary torque. The lower speed train therefore enables a motor of lower horsepower and weight to drive the propeller at the efficient higher pitch angle and therefore drive the craft at higher speeds. Said shift to the lower speed train is executed at will by simply rotating the control lever 206 to the position B for adjusting the clutch 121a to the partial mesh condition and thus disabling the higher speed power train in its function of transmitting driving force from the engine to the propeller and so the lower speed train comes into use for that purpose.

It will also be noted that when the control lever 206 is moved to position B so the clutch is in the partial mesh condition, the higher speed train is mobilized for establishment as a cranking force transmitter between the propeller and engine, as fully explained with respect to the first two embodiments.

While I have herein shown and described but a limited number of embodiments of the invention, it will be understood that the invention extends to other embodiments, forms, modifications, structures and details falling within the scope and spirit thereof and not sacrificing all of its material advantages.

I claim:

1. An aircraft change-speed transmission comprising an engine-driven drive shaft, a propeller-driving driven shaft, relatively low and high speed driving connections individually establishable in driving relation between said shafts, the lower speed connection being overrunning for adapting it to remain mobilized though inoperative while the higher speed connection is established and in operation, and the higher speed connection including clutch means operable in response to a selected speed of the drive shaft to establish the higher speed connection for the transmission of power therethrough from the drive shaft to the driven shaft and in response to a selected lower speed of the drive shaft manipulatable to disrupt such establishment of power transmission while maintaining said higher speed connection between said shafts sufficiently to prevent the driven shaft overrunning the drive shaft.

2. In an aircraft change-speed transmission for use between the engine and propeller of such aircraft, a power transmitting connection for relatively high speed drive of the propeller and thus employable advantageously for transmitting cranking power from the propeller to the engine, and said connection including a clutch operable in response to a selected low speed of the drive shaft to establish said connection for the transmission of cranking force from the propeller to the engine while being also operable to condition said connection so it is ineffective for transmitting driving force from the engine to the propeller.

3. In an aircraft change-speed transmission for use between the engine and propeller of such aircraft, a propeller driving connection of relatively low speed driving ratio between the propeller and the engine, a propeller driving connection of relatively high speed driving ratio adapting the same for advantageous employment as a cranking force transmitter between the propeller and engine, said last named connection including clutch means settable in different adjustments for conditioning the same for respectively different operating characteristics, said clutch including drive and driven counterparts rotatable respectively with the engine and propeller and operable when set in one of said adjustments to connect its said counterparts for common rotation in both directions to condition said connection for effecting a two-way high speed drive between the engine and propeller, and said clutch being so operable in another of its adjustments that the drive counterpart is free to overrun the driven counterpart so that lower speed connection of the transmission may be employed for driving the propeller from the engine, but that the driven counterpart is constrained from overrunning the drive counterpart so the relatively high speed train is conditioned for the transmission of said cranking force from the propeller to the engine.

4. In an aircraft change-speed transmission for use between the engine and propeller of such aircraft, a propeller driving connection of relatively low speed, a propeller driving connection of relatively high speed driving ratio adapting the same for advantageous employment in a reverse transmission of power as a cranking force transmitter between the propeller and engine, said last named connection including a jaw clutch wherein there are drive and driven toothed counterparts respectively rotatable with the engine and propeller and axially meshable to establish said connection in two-way high speed driving relation between the engine and propeller, the teeth on each counterpart being circumferentially spaced thereabout and having end faces which are generally in opposed relation, axially of the clutch, with said faces on the teeth of the other of said counterparts when the latter are demeshed, the end faces on certain of said teeth being bevelled spirally of the clutch and thus forming pointed edges on said teeth extending generally radially of the clutch, yieldable means having a tendency to maintain a relative axial position of said counterparts wherein their teeth end faces are circumferentially aligned, to cause said bevelled end faces to ratchet over the tooth end faces opposed thereto during rotation of the drive counterpart by the engine at an overspeed relatively to the speed of the driven counterpart as during drive of the propeller from the engine through the lower speed connection of the transmission, and to cause said pointed teeth edges to catch upon the teeth of the counterpart opposed thereto when the driven counterpart tends to overrun the drive counterpart and thus condition said relatively high speed connection for transmitting said cranking force from the propeller to the engine.

5. In a change-speed transmission for use between the engine and the propeller of an aircraft, an engine-driven drive shaft, a propeller-driving driven shaft, relatively lower and higher speed transmitting driving connections individually establishable in driving relation between said shafts, the lower speed connection being overrunning for adapting it to remain mobilized while the higher speed connection is established and in operation, the higher speed connection including an adjustable clutch wherein there are drive and driven parts respectively rotatable with the drive and driven shafts, said clutch being normally in one adjustment in which the drive part is free to overrun the driven part so the driven shaft is drivable from the drive shaft through the lower speed connection without interference by the higher speed connection, but in which adjustment the driven part is constrained against overrunning the drive part to condition the higher speed connection for transmitting engine-cranking force from the driven shaft to the drive shaft, said clutch being placeable in a second adjustment, upon synchronization of the drive and driven parts, in which said parts are constrained against relative rotation, to establish the higher speed connection in driving relation between said shafts, and means becoming conditioned in response to attainment of a predetermined speed of one of said shafts for placing the clutch in the second adjustment upon the occurrence of said synchronism.

6. In a change-speed transmission for use between the engine and the propeller of an aircraft, an engine-driven drive shaft, a propeller-driving driven shaft, relatively lower and higher speed driving connections individually establishable in driving relation between said shafts, the lower speed connection being overrunning for adapting it to remain mobilized while the higher speed connection is established and in operation, the higher speed connection including a clutch wherein there are complemental drive and driven coaxially rotatable counterparts of which the teeth are substantially meshable axially of the clutch to establish said higher speed connection in driving relation between said shafts so the drive shaft can drive the driven shaft therethrough, of which counterpart the teeth are disposable in a partial meshed relation, and of which counterparts the teeth upon the least one are bevelled spirally of the clutch upon surfaces generally opposed to corresponding surfaces upon the other to facilitate ratcheting of said surfaces during said partial meshed relation while the speed of the drive counterpart exceeds that of the driven counterpart and to facilitate the catching of the driven counterpart teeth upon those of the drive counterpart when the driven counterpart tends to overrun the drive counterpart and thus establish the higher speed connection for transmitting an engine cranking force from the driven shaft to the drive shaft, means for yieldingly urging one of the counterparts to axially approach the other for meshing the teeth, and speed responsive means operable responsively to the speed of one of said shafts in control of said urging means, said speed responsive means being operable at low speeds of said shaft to control said approach of the one counterpart so only said partial meshed relation can exist and operable at higher speeds of said shaft to control said urging means for urging said one counterpart axially farther to establish said substantial meshing of the teeth upon synchronization of the counterparts.

7. A change-speed transmission comprising drive and driven shafts; a planetary gear unit for drivingly connecting said shafts including a rotatable sun gear, a ring gear connected with the drive shaft for rotation thereby, a planet gear carrier connected with the driven shaft for rotating the same, and planet gears journalled on said carrier and mutually meshed with said sun and ring gears; a one-way holding device operable to prevent backward rotation of the sun gear while the planet gears react thereon during forward rotation of the drive shaft in the transmission through said unit of forward rotation to the carrier and hence to the driven shaft at reduced speed relatively to the drive shaft; and one-way clutch means having parts respectively connected for rotation with said carrier and one of said gears and relatively rotatable in one direction incurred pursuant to forward rotation of the drive shaft at speeds in excess of that of the driven shaft but non-relatively rotatable in the opposite direction to prevent forward overrun of the drive shaft by the driven shaft, and said one-way clutch means being conditional to prevent relative rotation in either direction between said parts.

8. A change-speed transmission comprising drive and driven shafts arranged in end-to-end coaxial relation with the driven shaft disposed forwardly of the drive shaft; a planetary gear unit for drivingly interconnecting said shafts including a sun gear rotatable about the driven shaft, a ring gear concentric with the sun gear and connected with the drive shaft for rotation thereby, a planet carrier drivingly connected with the driven shaft rearwardly of the sun gear, and planet gears journalled on said carrier and mutually meshed with said sun and ring gears; a one-way holding device disposed forwardly of the sun gear and operable thereon to prevent backward rotation thereof during forward rotation of the drive shaft in the transmission therefrom through said unit of forward rotation to the carrier and to the driven shaft connected therewith at reduced speed relatively to the drive shaft; and one-way clutch means disposed rearwardly of said unit, said clutch means including counterparts respectively connected with and for rotation coaxially of and in unison with said carrier and the ring gear, said counterparts being relatively rotatable in one direction incurred pursuant to forward rotation of the drive shaft at speeds in excess of that of the driven shaft but non-relatively rotatable in the opposite direction to prevent forward overrun of the drive shaft by the driven shaft, and said one-way clutch means being conditional to prevent relative rotation in either direction between said counterparts.

9. A change-speed transmission comprising drive and driven shafts arranged in end-to-end coaxial relation with the driven shaft disposed forwardly of the drive shaft; a rearwardly facing driving bell coaxial with the drive shaft and connected for rotation therewith; a planetary gear unit for providing a speed reduction connection between said shafts and including a ring gear on said bell for rotation therewith; a sun gear rotatable about the driven shaft concentrically with the ring gear, a planet gear carrier drivingly connected with the driven shaft rearwardly of the sun gear, and planet gears journalled on said carrier and mutually meshed with the sun and ring gears; a one-way holding device disposed forwardly of the sun gear and operable thereon to prevent backward rotation thereof during forward rotation of the drive shaft, bell and ring gear in the transmission therefrom through said unit of forward rotation to the carrier and to the driven shaft connected therewith at reduced speed relatively to the drive shaft; an adjustable clutch disposed within said bell and including drive and driven parts respectively rotatable with the drive and driven shafts, said clutch having one adjustment in which the drive part is free to overrun the driven part so the driven shaft is drivable at reduced speed from the drive shaft through the planetary gear unit but in which adjustment the driven part is constrained against overrunning the drive part wherefore engine-cranking force is transmittable through said clutch from the driven shaft to the drive shaft, said clutch being placeable in a second adjustment, upon synchronization of the drive and driven parts, in which said parts are constrained against relative rotation in either direction; and speed responsive means within said bell in control of said clutch and operable upon attainment of a predetermined speed of one of the parts of planetary gear unit and upon the occurrence of said synchronism of said clutch parts to change the clutch from the one adjustment to the second adjustment.

10. In a change-speed transmission for use between the engine and the propeller of an aircraft, an engine-driven drive shaft, a propeller-driving driven shaft, relatively lower and higher speed power transmitting connections individually establishable in driving relation between said shafts, the lower speed connection being overrunning for adapting it to remain mobilized while the higher speed connection is established and in operation, the higher speed connection including an adjustable clutch wherein there are drive and driven parts respectively rotatable with the drive and driven shafts, said clutch having one adjustment in which the drive part is free to overrun the driven part so the driven shaft is drivable from the drive shaft through the lower speed connection without interference by the higher speed connection but in which adjustment the driven part is constrained against overrunning the drive part, said clutch being placeable in a second adjustment in which the parts are constrained against relative rotation in both directions to establish the higher speed connection in driving relation between said shafts, yieldable means normally maintaining said second adjustment, and means manipulatable during operation of the higher speed connection for effecting the second adjustment and thus demobilizing such higher speed connection.

OSCAR H. BANKER.